June 30, 1931.   R. HATFIELD   1,812,697
TIRE CHAIN FASTENING MEANS
Filed July 6, 1929
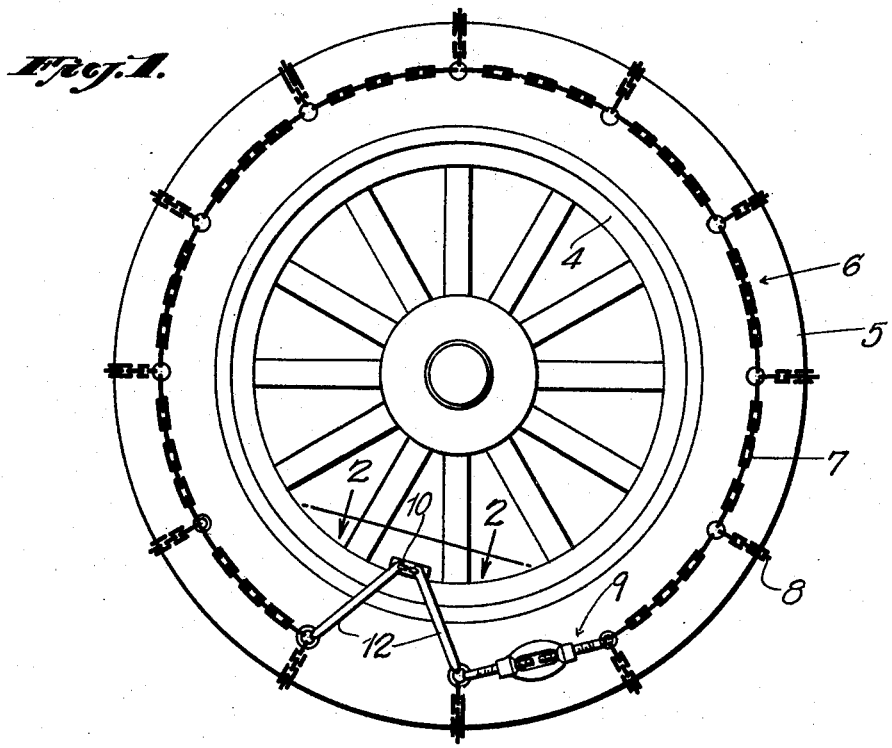
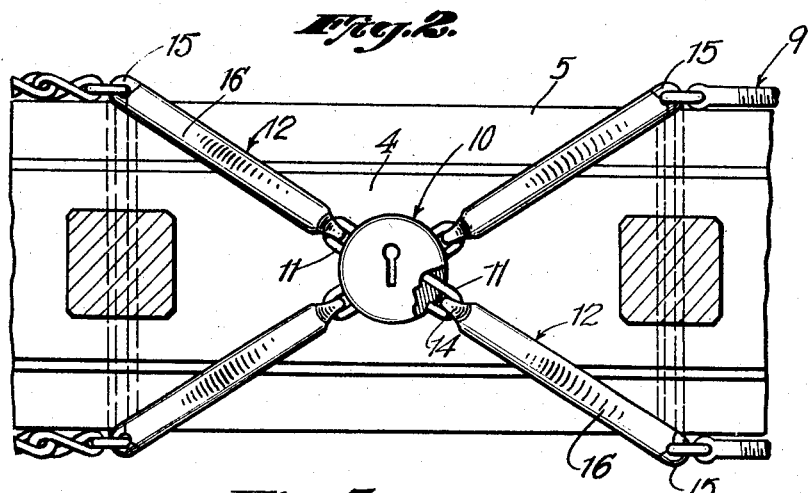
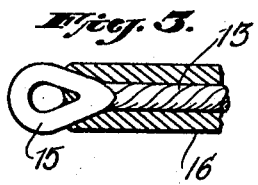
Inventor
RAY HATFIELD.
By *Clarence A. O'Brien*
Attorney Patented June 30, 1931

1,812,697

UNITED STATES PATENT OFFICE

RAY HATFIELD, OF SPRINGFIELD, ILLINOIS

TIRE CHAIN FASTENING MEANS

Application filed July 6, 1929. Serial No. 376,454.

This invention relates to the broad class of automotive appliances and has more particular reference to the removable anti-skid chain used in association with pneumatic and solid tired vehicle wheels.

The principal novelty resides in the provision of novel and unique means for securing the ends of the side chains of the main chain together in a manner to expedite application and removal of the complete chain, to simplify the structure, and to maintain the chain in position in a more dependable and satisfactory manner.

The gist of the invention is in the provision of an extra large lock which is seated against the inner-periphery of the rim of the wheel, and which is constructed to accommodate the eye equipped inner ends of a quartet of securing elements, thus providing a sturdy and efficient fastening means which will fulfill the requirements of a device of this class in a highly satisfactory manner.

Other features and advantages will become more readily apparent from the following drawings and description.

In the drawings:

Figure 1 is a side elevational view of an ordinary pneumatic tire equipped vehicle wheel provided with a removable tire chain embodying the fastening means constructed in accordance with the present invention.

Figure 2 is a horizontal sectional view taken approximately upon the plane of the line 2—2 of Figure 1, the section being quite enlarged.

Figure 3 is a fragmentary section of one of the retaining elements.

Referring to Figure 1 it will be observed that the reference character 4 designates the rim of the usual spoke formed wheel. The reference character 5 denotes an ordinary pneumatic tire. Then too the reference character 6 designates generally an anti-skid chain such as is used at the present time in trade. This includes the customary circumferential side chains 7 and the cross or tread chains 8. The reference character 9 merely designates conventional turnbuckles for taking up slack to compensate for undue wear as the device is used for a prolonged period of time.

As before indicated, the chief novelty resides in the retaining means. As shown in Figure 2, this comprises an extra large circular key controlled lock 10. This is equipped with a plurality of radially expansible and contractible hooked shackels 11. These are arranged about the periphery and in a radial manner. These shackles are intended to accommodate the chain retaining and anchoring elements generally designated by the reference character 12. There are four of these elements and they are connected to the free ends of the circumferential side chain. Each element is the same in construction and the description of one will suffice for all. Referring to Figure 3, the preferred embodiment comprises a flexible cable 13, having eyes 14 and 15 at its opposite ends. The eye 15 at the outer end connects with the side chain and the eye 14 at the inner end has detachable connection with the bill or hook of the shackle 11, as is obvious in Figure 2. The reference character 16 merely designates a rubber covering or casing of suitable material which is utilized as a protector. This is flexible along with the cable, thus permitting the element 12 to conform to the rim and tire, and to be fastened to the lock 10 so that the lock rests firmly and substantially flat against the inner periphery of the wheel rim.

A lock of this character, being unusually large, will be found convenient, sturdy and practicable. It will doubtless fulfill the requirements of fastening means of this class in that it may be placed in position and removed with readiness and depended upon to serve well under any and all conditions.

It is easily controlled and therefore not subject to use by unauthorized persons. The parts are detachable and susceptible of being replaced and repaired. The fact is, it is believed that this fastening means is an individual and new contribution to the art. It is thought too, that persons skilled in the art to which the invention relates will be able to obtain a clear understanding of the same after considering the description in conjunction with the drawings. Therefore, a more lengthy description is believed to be unnecessary.

Minor changes in shape, size and rearrangement of details coming within the field of invention claimed may be resorted to in actual practice if desired.

Having thus described my invention what I claim as new and desire to secure by Letters Patent, is:

A fastening means for anti-skid chains of the type employing circumferentially extending side chains having free ends, and connected by cross links, said fastening means comprising a lock having four shackles projecting therefrom, said lock having a flat rear base adapted to rest upon the inner peripheral face of a wheel felloe, and a plurality of connecting links, connecting said shackles to the free ends of said circumferentially extending side chains, each of said links comprising a flexible member having a loop at one end for engagement with a lock shackle, and a loop at the other end for engagement with a free end of a circumferentially extending chain.

In testimony whereof I affix my signature.

RAY HATFIELD.